UNITED STATES PATENT OFFICE.

BIRDSEY L. MALTBIE, OF EAST ORANGE, NEW JERSEY.

MEDICINAL AND PHARMACEUTICAL PREPARATION.

1,047,961.  Specification of Letters Patent.  Patented Dec. 24, 1912.

No Drawing.  Application filed May 7, 1912. Serial No. 695,705.

*To all whom it may concern:*

Be it known that I, BIRDSEY L. MALTBIE, a natural born citizen of the United States of America, residing at East Orange, in the county of Essex and State of New Jersey, have invented certain new and useful Improvements in Medicinal and Pharmaceutical Preparations, of which the following is a specification.

This invention relates to a new chemical and medicinal preparation and has for its object the combining chemically of beechwood creosote and calcium hydrate. The elements of the creosote and calcium hydroxid are broken up and a mixture of new chemical combinations formed, this mixture of new chemical combinations usually being in the form of a granular powder and having a reddish brown color.

Physical evidence of the formation, in the product, of new chemical combinations lies in the fact that colorless beechwood creosote and calcium hydroxid, which is also colorless, when mixed in chemical proportions form a reddish brown hard substance, which is reducible to a granular powder.

That new chemical combinations are formed is further illustrated by the following formula:

$$Ca(OC_6H_3CH_3OCH_3)OH + Ca(OC_6H_4OCH_3)OH + (C_6H_5)OH + (H_2O)_3;$$

which represents the chemical formula of the calcium compounds of mono-methyl ethers of the substituted polyhydric phenols present, and is the product described when equal portions by weight of calcium hydroxid and creosote are combined in the presence of water. I do not, however, confine myself to the use of equal proportions by weight of calcium hydroxid and creosote; when, for instance, I use an increased proportion of calcium hydroxid with creosote in the presence of water, the combination is represented by the following formula:

$$Ca(OC_6H_3CH_3OCH_3)_2 + Ca(OC_6H_4OCH_3)_2 + Ca(OC_6H_5)_2 + H_2O,$$

which shows the calcium compounds of the di-methyl-ethers of the substituted polyhydric phenols present, together with calcium carbolate.

Neither do I confine myself to either of the proportions of calcium hydroxid and creosote as above stated. I sometimes change the proportion of calcium hydroxid and creosote. Neither do I confine myself to the combination of calcium hydroxid and creosote in the presence of water, the same chemical combinations taking place without the addition of the water.

These formulas illustrate the chemical combinations which take place, forming the calcium compounds of creosol and guaiacol, and called respectively "calcium creosote" and "calcium guaiacate," calcium carbolate also being formed; the calcium carbolate is a well-known salt, but the calcium creosate and calcium guaiacate are new.

A specific process for making the preparation is as follows: I take equal parts by weight of calcium oxid and beechwood creosote. To this I add water, one of the functions of which is to change the calcium oxid into calcium hydroxid. The compound is then quickly dried in the open air and granulated. The addition of water is not essential when I use calcium hydroxid. In the above process I do not confine myself, as above stated, to the use of equal quantities by weight of calcium oxid (or calcium hydroxid) and beechwood creosote.

Creosote is recognized by medical authorities as one of the most valuable remedies for tuberculosis, bronchitis and kindred diseases, but it has had comparatively limited use because of the inability to administer it in sufficient quantity to produce results, nausea and vomiting resulting from large doses. By chemically combining creosote with calcium hydroxid, I have very largely overcome this objection to creosote and have provided a new chemical compound which may be administered in doses of sufficient size to produce the desired results.

The essential features of my invention consist in the chemical combination of creosote and calcium hydroxid, the proportions of the ingredients of the compound being varied, as the occasion requires.

Guaiacol and creosol are phenol monomethyl-ethers, using the word "phenol" to include both benzophenol and toluophenol. The term "calcium-phenol-mono-methyl-ether" is therefore used in claim 1 to denote either calcium guaiacate or creosote.

Having thus described my invention, what I claim is,

1. A medicinal preparation consisting of calcium-phenol-mono-methyl ether.

2. A medicinal preparation containing a calcium salt of a substituted polyhydric phenol which contains the radical —O.CH$_3$.

3. A medicinal preparation containing calcium creosate.

4. A medicinal preparation containing calcium creosate and calcium guaiacate.

5. The process of making medicinal preparations, which consists in mixing a basic calcium compound with beechwood creosote, and forming a product containing the calcium compounds of creosol and guaiacol.

6. The process of making medicinal preparations, which consists in mixing calcium oxid with beechwood creosote and adding sufficient water to form calcium hydroxid, thereby forming a product containing the calcium compounds of creosol, guaiacol and phenol.

In testimony whereof said BIRDSEY L. MALTBIE has hereunto affixed his signature in the presence of two witnesses.

BIRDSEY L. MALTBIE.

Witnesses:
W. C. WARNER,
J. H. FOY.